United States Patent
Pasini

(10) Patent No.: US 9,061,446 B2
(45) Date of Patent: Jun. 23, 2015

(54) PROCESS, MOULD, DEVICES AND KIT FOR MANUFACTURING PRODUCTS MADE OF COMPOSITE MATERIALS, AS WELL AS PRODUCTS MANUFACTURED WITH THIS PROCESS AND/OR WITH THESE MEANS

(75) Inventor: Nicolò Pasini, Taino (IT)

(73) Assignee: AUTOMOBILI LAMBORGHINI S.P.A., Sant'Agata Bolognese Bo (IT)

( * ) Notice: Subject to any disclaimer, the term of this patent is extended or adjusted under 35 U.S.C. 154(b) by 127 days.

(21) Appl. No.: 13/807,648

(22) PCT Filed: Jul. 1, 2011

(86) PCT No.: PCT/IB2011/052906
§ 371 (c)(1),
(2), (4) Date: Feb. 14, 2013

(87) PCT Pub. No.: WO2012/001660
PCT Pub. Date: Jan. 5, 2012

(65) Prior Publication Data
US 2013/0216764 A1    Aug. 22, 2013

(30) Foreign Application Priority Data
Jul. 2, 2010    (IT) .......................... MI2010A001220

(51) Int. Cl.
*B29C 33/12*    (2006.01)
*B29C 70/72*    (2006.01)
(Continued)

(52) U.S. Cl.
CPC ......... *B29C 33/12* (2013.01); *Y10T 428/24008* (2015.01); *B29C 2045/14147* (2013.01);
(Continued)

(58) Field of Classification Search
USPC ............................. 264/257, 271.1, 275, 278
See application file for complete search history.

(56) References Cited

U.S. PATENT DOCUMENTS 3,339,609 A * 9/1967 Cushman ..................... 411/82.1
3,392,225 A * 7/1968 Phelan ........................... 264/262
(Continued)

FOREIGN PATENT DOCUMENTS

DE    4440852 C1    6/1996
EP    0806369 A1    11/1997
(Continued)

OTHER PUBLICATIONS

International Search Report issued to the corresponding International Application PCT/IB2011/052906 mailed on Feb. 6, 2012.
(Continued)

*Primary Examiner* — Atul P. Khare
(74) *Attorney, Agent, or Firm* — Lucas & Mercanti, LLP

(57) ABSTRACT

A process for manufacturing products made of composite materials is disclosed which includes the steps:
    screwing at least one insert provided with a threaded hole on the outer thread of at least one pin partially inserted in a removable manner in a mold;
    arranging on the mold one or more fiber layers provided with at least one opening in which the insert is arranged;
    curing resin with the layers arranged on the mold, so as to obtain a product made of a composite material which incorporates the insert and the layers;
    rotating the pin in the insert for removing it from the mold.
The present invention also relates to a mold, devices and a kit which can be employed for carrying out the process, as well as to products manufactured with this process and/or these means.

26 Claims, 4 Drawing Sheets

(51) Int. Cl.
*B29C 70/68* (2006.01)
*B29C 70/74* (2006.01)
*B29C 70/02* (2006.01)
*B29C 70/76* (2006.01)
*B29C 43/36* (2006.01)
*B29C 70/86* (2006.01)
*F16B 35/00* (2006.01)
*B29C 45/14* (2006.01)
*B29C 70/30* (2006.01)

(52) U.S. Cl.
CPC ..... B29C2045/14057 (2013.01); *B29C 70/682* (2013.01); *B29C 70/74* (2013.01); *B29C 33/123* (2013.01); *B29C 45/14065* (2013.01); *B29C 70/021* (2013.01); *B29C 70/76* (2013.01); *B29C 43/36* (2013.01); *B29C 70/30* (2013.01); *B29C 70/72* (2013.01); *B29C 70/86* (2013.01); B29C 2043/3628 (2013.01); *F16B 35/00* (2013.01)

(56) References Cited

U.S. PATENT DOCUMENTS

| | | | | |
|---|---|---|---|---|
| 3,775,238 A | * | 11/1973 | Lyman | 428/167 |
| 4,051,591 A | * | 10/1977 | Thompson | 29/433 |
| 4,536,116 A | * | 8/1985 | Murray | 411/427 |
| 4,800,643 A | * | 1/1989 | Higgins | 29/458 |
| 5,240,543 A | * | 8/1993 | Fetterhoff et al. | 156/293 |
| 8,393,601 B2 | * | 3/2013 | de Mola | 267/141.5 |
| 2010/0086377 A1 | * | 4/2010 | de Mola | 411/176 |
| 2011/0031643 A1 | | 2/2011 | Hache | |

FOREIGN PATENT DOCUMENTS

| | | |
|---|---|---|
| EP | 2418413 A1 | 2/2012 |
| FR | 2664528 A1 | 1/1992 |
| FR | 2664529 A1 * | 1/1992 |
| FR | 2926745 A1 | 7/2009 |
| JP | 5069444 A | 3/1993 |
| WO | 97/25172 A1 | 7/1997 |
| WO | 2006/063185 A1 | 6/2006 |
| WO | 2010/116527 A1 | 10/2010 |

OTHER PUBLICATIONS

International Preliminary Report on Patentability issued to the corresponding International Application PCT/IB2011/052906 completed on Oct. 12, 2012.

* cited by examiner

PROCESS, MOULD, DEVICES AND KIT FOR MANUFACTURING PRODUCTS MADE OF COMPOSITE MATERIALS, AS WELL AS PRODUCTS MANUFACTURED WITH THIS PROCESS AND/OR WITH THESE MEANS

CROSS-REFERENCE TO RELATED APPLICATIONS

This application is a §371 National Stage Entry of PCT/IB2011/052906, filed Jul. 1, 2011, which claims the benefit of Italian Patent Application No. MI2010A001220, filed Jul. 2, 2010, the contents of each of which are incorporated herein by reference.

FIELD OF THE INVENTION

The present invention relates to a process for manufacturing products made of composite materials. The present invention also relates to a mould, some devices and a kit which can be employed for carrying out said process, as well as to the products manufactured with this process and/or these means.

BACKGROUND OF THE INVENTION

Known products made of composite materials incorporate threaded inserts for the fastening of components and/or structures. These inserts can be inserted in the unprocessed state between the fiber layers and worked after the cure of the resin with digital control machines, which make the holes and the threads. The precision needed by this working is extremely important since the exact position of the threaded holes must be ensured in the final product. However, this working is expensive, long and difficult to be carried out.

For overcoming this problem, WO 2006/063185 discloses inserts which are already threaded and are slipped onto smooth pins firmly fixed to the mould, after which pieces or powder of fibers are arranged and cured on the mould, so as to incorporate the threaded inserts. However, this known process does not ensure the exact arrangement in the final product and furthermore only inserts having holes which are arranged on axes perfectly parallel to the extraction axis of the product from the mould can be incorporated, otherwise this extraction would be impossible.

An and of the insert of WO 2006/063185 comprises a non-threaded cylindrical cavity coaxial to the threaded hole, while the opposite end comprises a perimetric outer ridge for preventing the insert from penetrating into the final product when a screw is screwed into the threaded hole of the insert through the end provided with the cylindrical cavity. However, only the contact between the outer surfaces of the insert and the final product prevents the insert from coming off in the opposite direction, for example if an excessive pressure is exerted during the screwing of the screw.

FR 2664529 discloses another threaded insert with a perimetric ridge, which insert is slipped onto a smooth pin which is provided with a threaded end screwed into a threaded hole of a mould, while the opposite end of the pin is provided with a washer for keeping the insert on the pin. This known pin can be unscrewed from the mould at the end of the process, however it has the above inconveniences of WO 2006/063185, in particular the imprecise axial and/or radial arrangement of the insert with respect to the mould.

Said technical problems would be particularly critical if said known inserts were employed in a process in which the fibers are grouped and arranged in overlapping layers on the mould, thus not in pieces or powder as in WO 2006/063185 or in bobbins as in FR 2664529.

SUMMARY OF THE INVENTION

It is therefore an object of the present invention to provide a process free from said disadvantages. Said object is achieved with a process, a mould, some devices and a kit, whose main features are disclosed in claims 19, 18, 1, 7, 9, 11 and 12, respectively, while other features are disclosed in the remaining claims.

Thanks to the particular partially threaded pins which are inserted in a removable manner in the mould, the process according to the present invention allows not only to arrange in extremely precise positions on the mould inserts which are already threaded, since the pins are inserted in holes which can be easily made on the mould with digital control machines, but also to orientate these inserts along axes which are not parallel to the extraction axis, since the pins can be easily removed before extracting the product from the mould. The pins can further be easily reinserted into the mould for manufacturing a new product.

The process according to the present invention also allows to arrange some fiber layers between the insert and the mould, without losing the exact position of the insert, so as to obtain a better union between insert and final product.

The inserts are provided with particular perimetric ridges which allow a precise coupling with the fiber layers and/or provided with a cylindrical cavity for hermetically closing the threaded hole with a particular complementary plug, so that the final product can in turn be used as a mould for other products, in which case the mould with the pins is called master.

The inserts can further be provided with particular bushings to be inserted into the threaded hole and to be replaced once they are worn out by use, so as to protect the thread of the inserts and prolong the life of the products provided with these inserts. For this purpose, the bushings are preferably kept in the inserts by particular removable stop means.

A particular extractor provided with an inverse thread allows the mechanical coupling and the subsequent removal of the pin in an easy and fast manner, since only a rotation of the extractor in the same hand is needed.

A kit comprising one or more pins, inserts and/or plugs, as well as preferably also an extractor, is particularly useful for manufacturing products made of composite materials by adapting moulds or masters previously employed with other processes, also of the know kind.

BRIEF DESCRIPTION OF THE DRAWINGS

Further advantages and features of the process, the mould, the devices and the kit according to the present invention will become clear to those skilled in the art from the following detailed and non-limiting description of an embodiment thereof with reference to the attached drawings, wherein.

DETAILED DESCRIPTION OF THE INVENTION

Figure 1:
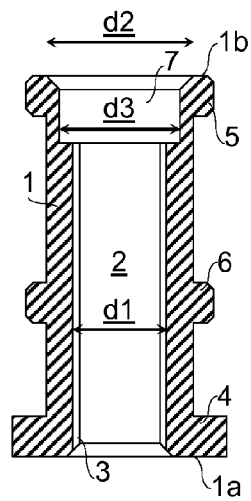
FIG. 1 shows a longitudinal section of the insert.
Figure 2:
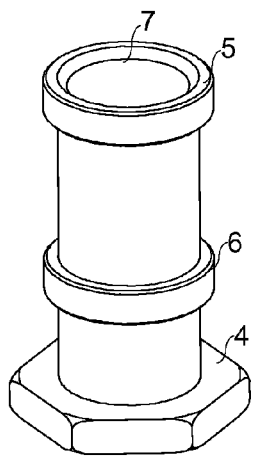
FIG. 2 shows a perspective view of the insert of FIG. 1.

Referring to FIGS. 1 and 2, it is seen that an insert 1 for composite materials comprises in a known way a through hole 2 provided with an inner thread 3, wherein the diameter of through hole 2 is greater than or at least equal, in particular equal, to the first diameter d1 of inner thread 3. Insert 1 has a substantially cylindrical shape wherein its outer wall has a second diameter d2 and at least one perimetric ridge 4, 5, 6. The outer wall of insert 1 is preferably treated, in particular with a sandblast process, for removing contaminant agents, if any, and then cleaned. A first perimetric ridge 4 has a polygonal, in particular hexagonal, outer profile and is arranged around a first end 1a of insert 1, in particular the end which is accessible from the outside when insert 1 is inserted in a product made of composite materials. A second perimetric ridge 5 is arranged around second end 1b of insert 1 opposite to first end 1a and has an outer cylindrical profile having a diameter shorter than first perimetric ridge 4, namely the outer profile of second perimetric ridge 5 is contained in the outer profile of first perimetric ridge 4, as it is clearly shown in FIGS. 1 and 2. A third perimetric ridge 6 is substantially the same as second perimetric ridge 5 and is arranged between the two ends 1a, 1b of insert 1, namely between first perimetric ridge 4 and second perimetric ridge 5. An end of through hole 2 leads to a cylindrical non-threaded cavity 7 which is coaxial to through hole 2 and has a third diameter d3 greater than or equal to first diameter d1 of inner thread 3 of through hole 2 and shorter than second diameter d2 of insert 1. Cylindrical cavity 7 leads in turn to second end 1b of insert 1, namely to the end opposite to first perimetric ridge 4.

Figure 3:
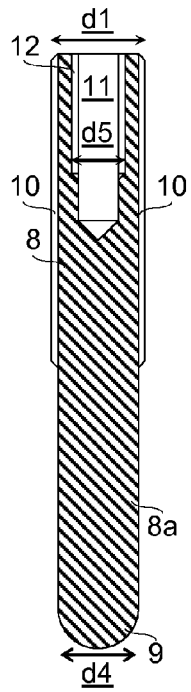
FIG. 3 shows a longitudinal section of the pin.
Figure 4:
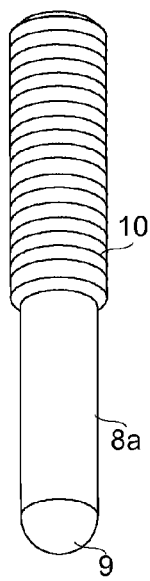
FIG. 4 shows a perspective view of the pin of FIG. 3.

Referring to FIGS. 3 and 4, it is seen that pin 8 according to the present invention comprises a blunted, in particular rounded, point 9 and an outer thread 10 having substantially the same diameter d1 of inner thread 3 of insert 1. Outer thread 10 covers only a portion of pin 8, while the remaining portion 8a is not threaded and has a fourth diameter d4 shorter than diameter d1 of inner thread 10. The end of pin 8 opposite to non-threaded portion 8a is provided with a first connection member 11 for rotating pin 8 around its longitudinal axis. In the present embodiment, first connection member 11 is preferably a coaxial hole provided with an inner thread 12 having a fifth diameter d5 and made in the opposite hand of outer thread 10, but in other embodiments first connection member 11 may comprise for example a prismatic coaxial seat or head, having a square-, octagonal- or cross-shaped section.

Figure 5:
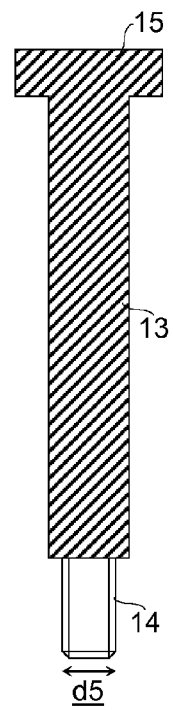
FIG. 5 shows a longitudinal section of the extractor.
Figure 6:
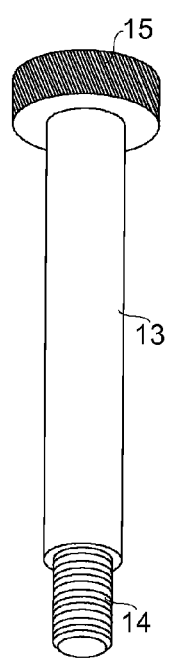
FIG. 6 shows a perspective view of the extractor of FIG. 5.

Referring to FIGS. 5 and 6, it is seen that extractor 13 according the present invention comprises a stem with an end provided with a second connection member 14 complementary to first connection member 11 of pin 8, in particular an outer thread having the same hand and a diameter substantially equal to fifth diameter d5 of inner thread 12 of pin 8. The other end of extractor 13 comprises rotation means 15, for example a knurled cylindrical head for allowing the manual rotation of extractor 13 around its longitudinal axis. Rotation means 15 may also be mechanical and/or electrical, for example comprising a shaped head for being coupled with a complementary point of a drill or an electric screwdriver.

Figure 7:
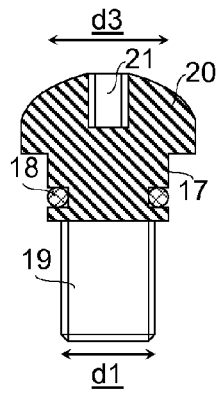
FIG. 7 shows a longitudinal section of the plug.
Figure 8:
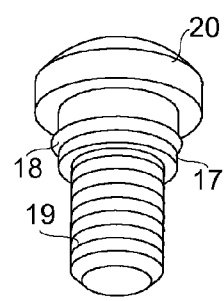
FIG. 8 shows a perspective view of the plug of FIG. 7.

Referring to FIGS. 7 and 8, it is seen that plug 17 according to the present invention comprises a cylindrical body having a diameter substantially equal to third diameter d3 of cylindrical cavity 7 of insert 1. At least one annular gasket 18 is arranged in a perimetric groove made in the outer wall of the cylindrical body, which is joined to a coaxial threaded stem 19 having a diameter substantially equal to first diameter d1 of inner thread 3 of insert 1, namely a diameter shorter than or equal to diameter d3 of the cylindrical body, so that plug 17 can be screwed into insert 1 with the cylindrical body arranged in cylindrical cavity 7 of insert 1. Plug 17 also comprises a head 20 at the end opposite to threaded stem 19, which head 20 has a shaped portion 21, for example a prismatic seat with a polygonal, in particular hexagonal, profile, so that threaded stem 19 can be rotated by operating shaped portion 21, for example with a tool, until head 20 abuts against second end 1b of insert 1. Shaped portion 21 may also consist of a knurled cylindrical head as rotation means 15 of extractor 13.

Figure 9:
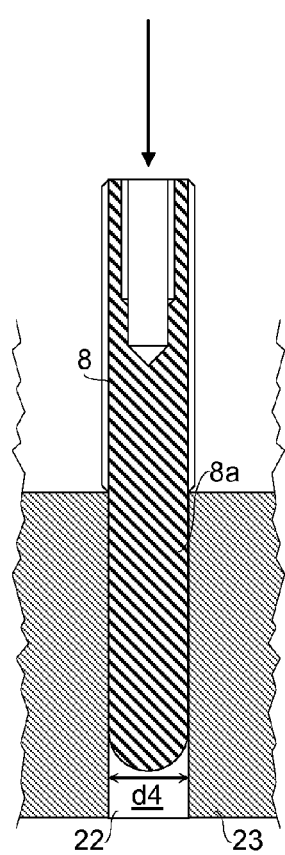
FIGS. 9 to 15 show longitudinal sections of the kit, the mould and the product during the operating steps of the process.

Referring to FIG. 9, it is seen that in a first operating step of the process according to the present invention pin 8 is covered with a detaching substance and inserted into a hole 22 made on a mould 23. Hole 22 has substantially the same diameter d4 of non-threaded portion 8a of pin 8, so that outer thread 10 of pin 8 projects from mould 23.

Figure 10:
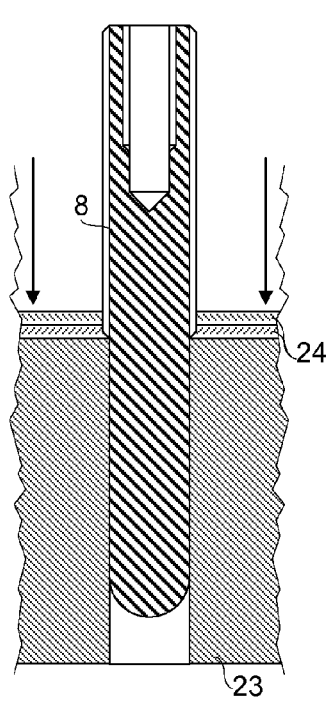

Referring to FIG. 10, it is seen that in a second operating step one or more first layers 24 of fibers, in particular carbon fibers, are arranged onto mould 23. First layers 24 are provided with at least one hole having a diameter substantially equal to diameter d1 of outer thread 10 of pin 8, so that the latter can be arranged in this hole.

Figure 11:
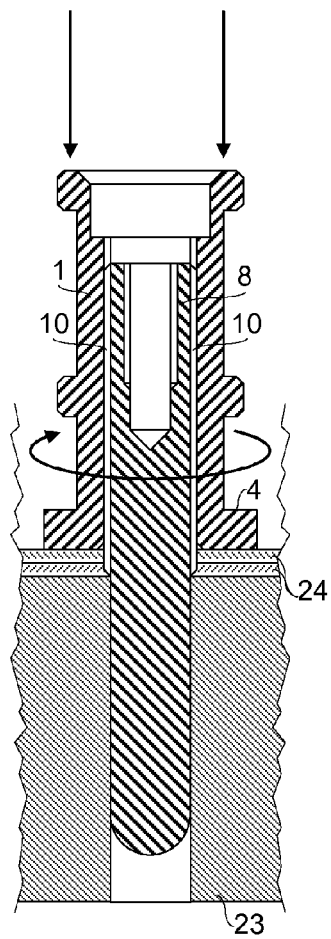

Referring to FIG. 11, it is seen that in a third operating step insert 1 is screwed onto outer thread 10 of pin 8, until first perimetric ridge 4 does not contact a first layer 24. In an alternative embodiment, insert 1 is screwed onto pin 8 without arranging first layers 24 on mould 23, so that insert 1 contacts mould 23. Insert 1 can be rotated by means of a tool coupled with the polygonal surface of first perimetric ridge 4.

Figures 12, 13, 14:
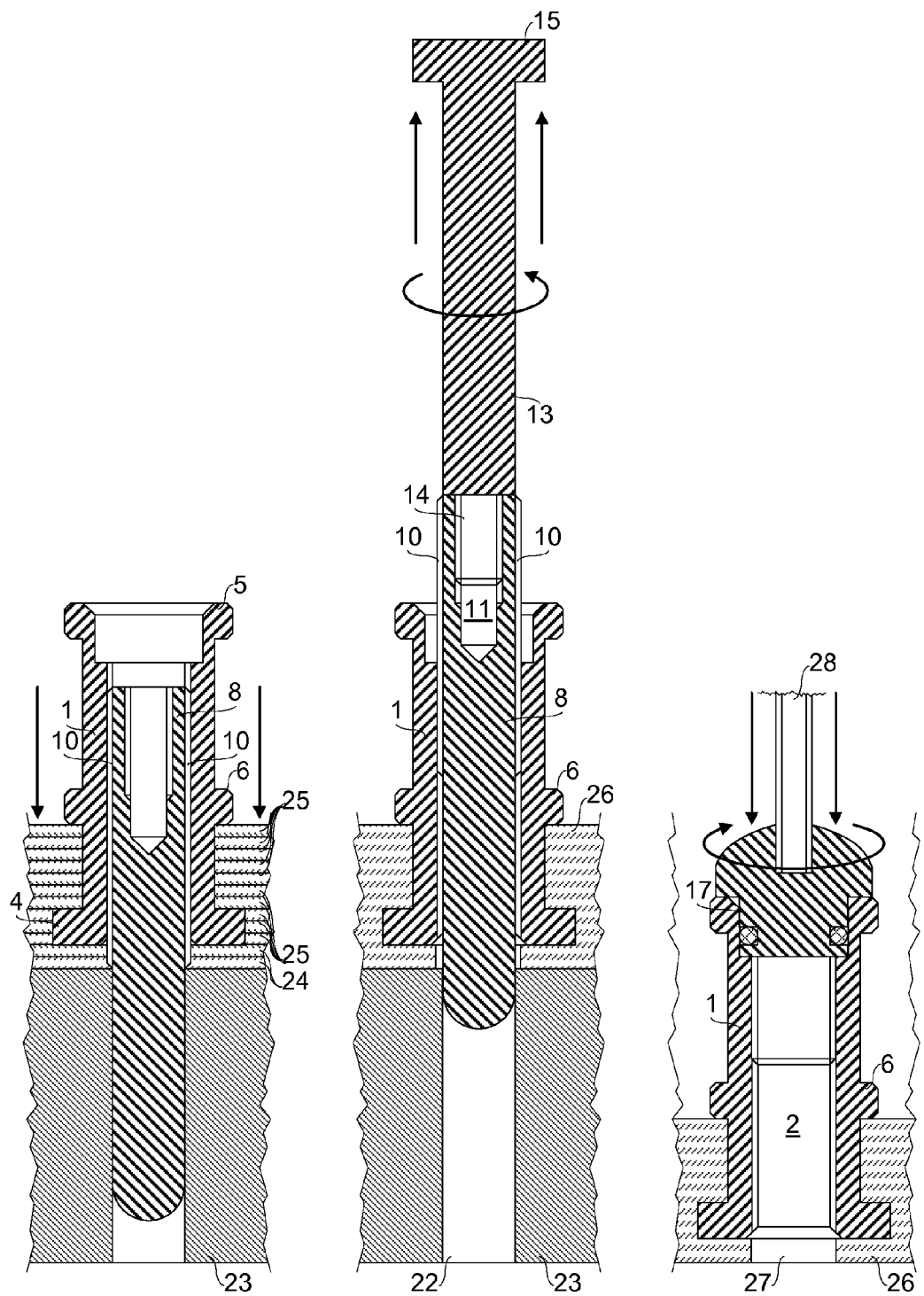

Referring to FIG. 12, it is seen that in a fourth operating step one or more second layers 25 of fibers, in particular carbon fibers, are arranged one on the other onto first layers 24 or, if the latter are absent, directly onto mould 23. Second layers 25 are provided with at least one opening having a diameter substantially equal to second diameter d2 of insert 1, so that the latter is arranged in this opening. Some second layers 25 can be provided with a larger opening for adapting to the outer profile of first perimetric ridge 4. Second layers 25 are arranged one on the other until they reach third perimetric ridge 6. During their deposition, layers 24, 25 are slightly forced on insert 1 for overcoming perimetric ridges 4, 5 and/or 6.

Referring to FIG. 13, it is seen that in a fifth operating step mould 23 is closed and layers 24 and 25 are impregnated with a resin, which is then cured so as to form a product 26 made of a composite material which incorporates insert 1 and layers 24, 25, after which mould 23 is opened. Pin 8 is then unscrewed from insert 1 and removed from hole 22 of mould 23 by rotating extractor 13. During this removal, second connection member 14 of extractor 13 is mechanically coupled with first connection member 11 of pin 8. Pin 8 is preferably removed also from insert 1. Layers 24, 25 can be dry, namely with a content of resin lower than 10%, or be pre-impregnated with resin, in which case no resin is injected into mould 23 for manufacturing product 26.

Referring to FIG. 14, it is seen that before extracting product 26 from mould 23, insert 1 can be hermetically closed by plug 17 screwed by means of a tool 28 into second end 1b opposite to hole 27 made in piece 26 in correspondence with through hole 2 of insert 1.

Figure 15:
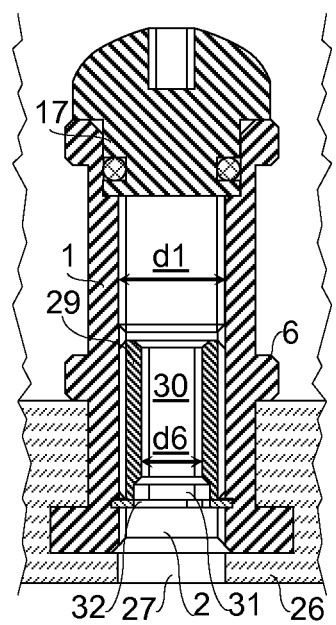

Referring to FIG. 15, it is seen that a bushing 29 is screwed into through hole 2 of insert 1. For this purpose, bushing 29 is provided with an outer thread having a diameter substantially equal to first diameter d1 of inner thread 3 of insert 1. Bushing 29 comprises a through hole 30 provided with an inner thread having a sixth diameter d6 shorter than first diameter d1. An end of through hole 30 is provided with a polygonal, in particular hexagonal, seat 31, for facilitating the screwing of bushing 29 into insert 1. Removable stop means are arranged in through hole 2 for keeping bushing 29 in insert 1. In particular, said removable stop means comprise plug 17 which prevent bushing 29 from going out through second end 1b of insert 1, as well as a retaining ring 32 snap-fitted in a removable manner into a circular seat which can be made in through hole 2 for preventing bushing 29 from coming out through first end 1a of insert 1. Bushing 29 can also be screwed into through hole 2 of insert 1 before screwing plug 17, in which case bushing 29 can be also inserted through second end 1b of insert 1.

Possible modifications and/or additions may be made by those skilled in the art to the hereinabove disclosed and illustrated embodiment while remaining within the scope of the following claims.

The invention claimed is:

1. A process for manufacturing a product made of composite material incorporating at least one insert, the process comprising the following steps:
   providing a mold for forming the product, the mold being adapted with one or more holes;
   partially inserting into the one or more holes one or more respective removable pins having an outer thread, the one or more holes having a diameter substantially equal to an outer diameter of a respective pin portion partially inserted therein;
   screwing one or more respective inserts provided with a threaded through hole onto the outer thread of the one or more removable pins;
   arranging on the mold one or more fiber layers provided with at least one opening, an insert screwed onto a partially inserted pin being positioned in a respective opening of the one or more fiber layers;
   curing the one or more fiber layers with a resin in the mold so as to obtain the product made of a composite material formed from the one or more inserts and the one or more cured fiber layers;
   rotating the one or more removable pins so as to remove the one or more removable pins from the mold; and
   extracting from the mold the product made of a composite material incorporating the one or more inserts.

2. The process according to claim 1, wherein the one or more pins, as a result of said rotating, are also removed from a respective insert.

3. The process according to claim 1, wherein the one or more inserts are hermetically closed by a plug after said removing from a respective insert.

4. The process according to claim 3, wherein the plug comprises a cylindrical body with at least one annular gasket arranged in a perimetric groove made in the outer wall of the cylindrical body, which cylindrical body has one end joined to a coaxial threaded stem having a diameter shorter than or equal to the diameter of the cylindrical body, while the other end comprises a head provided with a shaped portion for rotating the threaded stem.

5. The process according to claim 2, further comprising screwing a respective bushing into the threaded hole of the one or more inserts after said removing of the one or more removable pins from a respective insert, wherein the bushing has an outer thread and a through hole with an inner thread.

6. The process according to claim 5, wherein a respective removable stop means is arranged in the through hole of the one or more inserts for keeping the bushing therein.

7. The process according to claim 6, wherein said removable stop means comprise a retaining ring inserted in a circular seat made in the through hole.

8. The process according to claim 1, wherein said arranging is conducted before said screwing.

9. The process according to claim 1, wherein said screwing is conducted before said partially inserting.

10. The process according to claim 1, wherein said arranging is conducted before said partially inserting.

11. The process according to claim 1, wherein one end of the threaded hole of the one or more inserts leads to a non-threaded cylindrical cavity coaxial to the threaded hole and has a diameter greater than or equal to the diameter of the inner thread of the threaded hole.

12. The process according to claim 11, wherein the cylindrical cavity leads in turn to one end of the insert.

13. The process according to claim 1, wherein the outer wall of one or more inserts has a first perimetric ridge.

14. The process according to claim 13, wherein the first perimetric ridge is arranged around a first insert end.

15. The process according to claim 14, wherein at least one further perimetric ridge is arranged around a second insert end or between the two insert ends.

16. The process according to claim 15, wherein said arranging is conducted after said partially inserting so that at least some of the arranged fiber layers having the at least one opening are positioned between the first and further perimetric ridges of the one or more inserts.

17. The process according to claim 14, wherein the further perimetric ridge has a diameter smaller than the first perimetric ridge.

18. The process according to claim 17, wherein the diameter of the non-threaded portion is less than the diameter of the outer thread.

19. The process according to claim 1, wherein the partially inserted pin portion is a non-threaded portion sized for said partially inserting.

20. The process according to claim 19, wherein the end of the one or more pins opposite to the non-threaded portion is provided with a respective connection member for rotating the one or more pins around a longitudinal axis thereof.

21. The process according to claim 20, wherein the connection member is a coaxial hole provided with an inner thread made in the opposite hand of the outer thread.

22. The process according to claim 20, further comprising conducting said rotating by means of an extractor comprising a shank with one end provided with a connection member complementary to the pin connection member and another end comprising rotation means for rotating the extractor around its longitudinal axis.

23. The process according to claim 22, wherein the pin connection member is a coaxial hole provided with an inner thread made in the opposite hand of the outer thread, and the connection member of the extractor comprises an outer thread having the same hand and a diameter substantially equal to the diameter of the inner thread of the one or more pins.

24. The process according to claim 16, wherein the arranged fiber layers positioned between the first and further perimetric ridges are slightly forced onto the one or more inserts so as to overcome a perimetric ridge thereof.

25. The process according to claim 16, further comprising arranging one or more initial fiber layers between the first perimetric ridge and the mold so as to encapsulate the first perimetric ridge between the initial fiber layers and the fiber layers positioned between the first and further perimetric ridges upon said curing.

26. The process according to claim 1, wherein the one or more pins are covered with a detaching substance before said inserting.

* * * * *